United States Patent
N'guessan

(10) Patent No.: US 12,079,644 B2
(45) Date of Patent: Sep. 3, 2024

(54) METHODS, SYSTEMS, AND MEDIA FOR GENERATING MODIFIED USER ENGAGEMENT SIGNALS BASED ON OBSTRUCTING LAYERS IN A USER INTERFACE

(71) Applicant: Google LLC, Mountain View, CA (US)

(72) Inventor: Sylvia N'guessan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 17/976,174

(22) Filed: Oct. 28, 2022

(65) Prior Publication Data
US 2024/0143346 A1    May 2, 2024

(51) Int. Cl.
*G06F 9/451* (2018.01)
(52) U.S. Cl.
CPC ................... *G06F 9/451* (2018.02)
(58) Field of Classification Search
CPC ....................................................... G06F 9/451
See application file for complete search history.

(56) References Cited

U.S. PATENT DOCUMENTS

| | | | | |
|---|---|---|---|---|
| 8,773,468 | B1 * | 7/2014 | Ballagh | G09G 5/14 345/634 |
| 2001/0055011 | A1 * | 12/2001 | Terao | G09G 5/14 345/204 |
| 2007/0252804 | A1 * | 11/2007 | Engel | H04N 13/395 345/98 |

(Continued)

OTHER PUBLICATIONS

Andujar, C., et al., "LOD Visibility Culling and Occluder Synthesis", In Computer Aided-Design, vol. 32, No. 13, Jul. 13, 2000, pp. 1-15.

(Continued)

*Primary Examiner* — K C Chen
(74) *Attorney, Agent, or Firm* — Shumaker & Sieffert, P.A.

(57) ABSTRACT

Methods, systems, and media for generating modified user engagement signals based on obstructed layers in a user interface are provided. In some embodiments, the method includes: identifying a plurality of layers in a user interface, wherein each layer in the plurality of layers has a layer depth value, and wherein the plurality of layers are presented in an order based on the layer depth value associated with each layer; selecting a first layer in the plurality of layers as a reference layer; determining a plurality of layer components from a remaining subset of layers in the plurality of layers, wherein the plurality of layer components results in at least one hidden component, wherein the at least one hidden component is a portion of the reference layer that is prevented from being viewed by a user of the user interface when the plurality of layer components is presented in the order indicated by the layer depth value of each layer; associating the plurality of layer components with an obstruction database for the reference layer; and generating, from a user engagement signal, a modified user engagement signal by identifying, using the obstruction database, a portion of the user engagement signal that is based on the at least one hidden component and removing the portion of the user engagement signal that is based on the at least one hidden component.

18 Claims, 8 Drawing Sheets

(56) References Cited

U.S. PATENT DOCUMENTS

| | | | |
|---|---|---|---|
| 2012/0044259 A1* | 2/2012 | Carlhian | G06F 3/04815 |
| | | | 345/629 |
| 2013/0321397 A1 | 12/2013 | Chen et al. | |
| 2016/0155411 A1* | 6/2016 | Liu | G09G 5/363 |
| | | | 345/660 |
| 2018/0189573 A1 | 7/2018 | Divakaran et al. | |
| 2018/0240266 A1* | 8/2018 | Chalk | G06T 15/80 |
| 2019/0058908 A1* | 2/2019 | Orlowski | H04H 60/33 |

OTHER PUBLICATIONS

Bittner, J., et al., "Visibility in Computer Graphics", In Environment and Planning B Planning and Design, vol. 30, No. 5, Sep. 2003, pp. 1-24.

* cited by examiner

METHODS, SYSTEMS, AND MEDIA FOR GENERATING MODIFIED USER ENGAGEMENT SIGNALS BASED ON OBSTRUCTING LAYERS IN A USER INTERFACE

TECHNICAL FIELD

The disclosed subject matter relates to methods, systems, and media for generating modified user engagement signals. More particularly, the disclosed subject matter relates to determining obstructed content based on multiple layers in a user interface and generating modified user engagement signals based on the determined obstructed content in the user interface.

BACKGROUND

Mobile and web client development platforms often rely on user engagement signals to provide advertisements, recommend new content, and trigger new features to provide to the user. For example, user engagement can be measured by calculating the amount of time a particular webpage or content screen has been shown to a user, such as a particular array of content items. Similarly, user engagement can be based on the user interaction with a particular content item being shown, such as a user clicking on a link, or selecting the content as a "favorite" item.

However, user engagement signals can be unreliable when content items are blocked by other components of the user interface, such as menus, search bars, notifications, etc. For example, a search bar can be displayed on top of a content feed. This can result in content being shown to a user, with some portions of the content feed being obstructed by features that are layered on top of the content feed. Such layering can result in inaccurate user engagement signals when the user interface collects user engagement signals based on the obstructed portions of the content feed.

Accordingly, it is desirable to provide new mechanisms for generating modified user engagement signals based on obstructing layers in a user interface.

SUMMARY

Methods, systems, and media for generating modified user engagement signals based on obstructing layers in a user interface are provided.

In accordance with some embodiments of the disclosed subject matter, a method for generating user engagement signals corresponding to media content is provided, the method comprising: identifying a plurality of layers in a user interface, wherein each layer in the plurality of layers has a layer depth value, and wherein the plurality of layers are presented in an order based on the layer depth value associated with each layer; selecting a first layer in the plurality of layers as a reference layer; determining a plurality of layer components from a remaining subset of layers in the plurality of layers, wherein the plurality of layer components results in at least one hidden component, wherein the at least one hidden component is a portion of the reference layer that is prevented from being viewed by a user of the user interface when the plurality of layer components is presented in the order indicated by the layer depth value of each layer; associating the plurality of layer components with an obstruction database for the reference layer; and generating, from a user engagement signal, a modified user engagement signal by identifying, using the obstruction database, a portion of the user engagement signal that is based on the at least one hidden component and removing the portion of the user engagement signal that is based on the at least one hidden component.

In some embodiments, the first layer in the plurality of layers is selected as the reference layer by determining a first layer depth value associated with a lowest layer in the order in which the plurality of layers are presented.

In some embodiments, the method further comprises determining that a subset of layers in the plurality of layers each have an opacity below a threshold value and removing the subset of layers from the plurality of layers, thereby resulting in the remaining subset of layers.

In some embodiments, each entry in the obstruction database comprises a first indication of a particular component from the plurality of layer components, a second indication of a particular layer depth value associated with the particular component, and a third indication of the portion of the reference layer which is prevented from being viewed by the particular component.

In some embodiments, the method further comprises: selecting a second layer in the plurality of layers as a target layer; determining an intersecting portion of the target layer that intersects the reference layer; and determining a plurality of layer components that result in at least one hidden component, wherein the at least one hidden component is located in the intersecting portion of the target layer, and wherein the at least on hidden component is prevented from being viewed by a user of the user interface when the plurality of layer components is presented in the presentation order indicated by the layer depth value of each layer.

In some embodiments, a first size of the reference layer is equal to a second size of a display device where the user interface is displayed.

In accordance with some embodiments of the disclosed subject matter, a system for generating user engagement signals corresponding to media content is provided, the system comprising a memory and a hardware processor that is configured to: identify a plurality of layers in a user interface, wherein each layer in the plurality of layers has a layer depth value, and wherein the plurality of layers are presented in an order based on the layer depth value associated with each layer; select a first layer in the plurality of layers as a reference layer; determine a plurality of layer components from a remaining subset of layers in the plurality of layers, wherein the plurality of layer components results in at least one hidden component, wherein the at least one hidden component is a portion of the reference layer that is prevented from being viewed by a user of the user interface when the plurality of layer components is presented in the order indicated by the layer depth value of each layer; associate the plurality of layer components with an obstruction database for the reference layer; and generate, from a user engagement signal, a modified user engagement signal by identifying, using the obstruction database, a portion of the user engagement signal that is based on the at least one hidden component and removing the portion of the user engagement signal that is based on the at least one hidden component.

In accordance with some embodiments of the disclosed subject matter, a non-transitory computer-readable medium containing computer executable instructions that, when executed by a processor, cause the processor to execute a method for generating user engagement signals corresponding to media content is provided, the method comprising: identifying a plurality of layers in a user interface, wherein each layer in the plurality of layers has a layer depth value, and wherein the plurality of layers are presented in an order based on the layer depth value associated with each layer; selecting a first layer in the plurality of layers as a reference layer; determining a plurality of layer components from a remaining subset of layers in the plurality of layers, wherein the plurality of layer components results in at least one hidden component, wherein the at least one hidden component is a portion of the reference layer that is prevented from being viewed by a user of the user interface when the plurality of layer components is presented in the order indicated by the layer depth value of each layer; associating the plurality of layer components with an obstruction database for the reference layer; and generating, from a user engagement signal, a modified user engagement signal by identifying, using the obstruction database, a portion of the user engagement signal that is based on the at least one hidden component and removing the portion of the user engagement signal that is based on the at least one hidden component.

In accordance with some embodiments of the disclosed subject matter, a system for generating user engagement signals corresponding to media content is provided, the system comprising: means for identifying a plurality of layers in a user interface, wherein each layer in the plurality of layers has a layer depth value, and wherein the plurality of layers are presented in an order based on the layer depth value associated with each layer; means for selecting a first layer in the plurality of layers as a reference layer; means for determining a plurality of layer components from a remaining subset of layers in the plurality of layers, wherein the plurality of layer components results in at least one hidden component, wherein the at least one hidden component is a portion of the reference layer that is prevented from being viewed by a user of the user interface when the plurality of layer components is presented in the order indicated by the layer depth value of each layer; means for associating the plurality of layer components with an obstruction database for the reference layer; and means for generating, from a user engagement signal, a modified user engagement signal by identifying, using the obstruction database, a portion of the user engagement signal that is based on the at least one hidden component and removing the portion of the user engagement signal that is based on the at least one hidden component.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
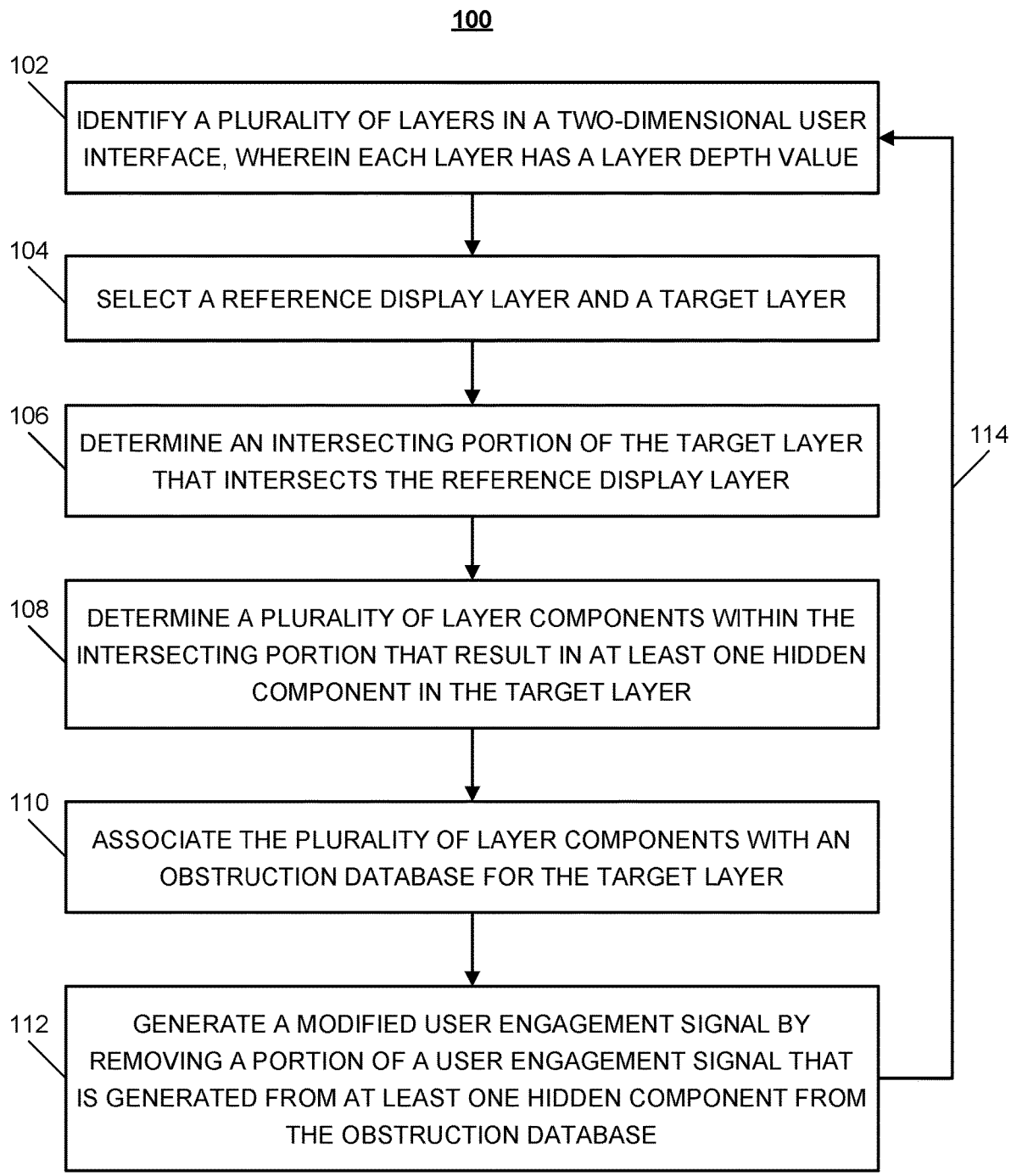
FIG. 1 shows an example flow diagram of an illustrative process for generating modified user engagement signals based on obstructing layers in a user interface in accordance with some embodiments of the disclosed subject matter.

In accordance with various embodiments of the disclosed subject matter, mechanisms (which can include methods, systems, and media) for generating modified user engagement signals based on obstructing layers in a user interface are provided.

In some embodiments, the mechanisms relate to determining portions of a two-dimensional user interface that are hidden by additional user interface layers which are presented above the hidden portion. The mechanisms can additionally store coordinates and other reference data for the hidden portions of the user interface. For example, a dialog box can appear on top of a base layer of a video feed within a media content application. In this example, although the video feed is served to the user across the entirety of the display region assigned to the video feed, the user does not see a small portion of the video feed that is blocked by the dialog box.

In particular, the mechanisms can calculate intersected areas, edge visibility, and visibility percentages for a user interface that has several layers, where the user interface has layers such as a reference layer, a target layer, and a layer of views that obstruct the target layer.

Obstructing layers can be, in some embodiments, a set of elements in a user interface which are positioned in a frame that is above (on top of) and parallel to a particular layers' two-dimensional (2-D) frame within the same user interface. Obstructing layers can be understood as a frame that is positioned in the z-axis of the user interface in some embodiments. In this context, in some embodiments, obstructing layers are the projection of frames from a higher position on the z-axis onto an xy-plane of the two-dimensional user interface, which can impact the presentation of the user interface by creating hidden elements when multiple layers are displayed simultaneously.

The mechanisms can determine obstructing layers and hidden components in a database which can be accessed by additional processes. For example, the obstruction database can be applied to compute user engagement signals and/or modify any features which depend on a determination of which content is visible to a user.

For example, a user engagement signal can be based on a determination that a particular content item is visible when the particular content item only has a single pixel appear on screen, while the majority of the content item remains hidden by a menu. The mechanisms can reference the obstruction database to determine the portion of the user engagement signal that is based on the single visible pixel. In this example, the user engagement signal does not accurately reflect what the user is seeing on screen, and the mechanisms can be applied to remove the portion of the user engagement signal that is based on the single visible pixel of the content item. Additionally, the mechanisms can update the obstruction database as the user navigates the user interface. For example, user interaction with a content feed can cause a previously hidden component to become fully visible, and the mechanisms can remove the entry associated with the previously hidden component from the obstruction database.

Turning to FIG. 1, a flow diagram of a process 100 for generating modified user engagement signals based on obstructing layers in a user interface in accordance with some embodiments of the disclosed subject matter is shown. In some embodiments, process 100 can run on a server such as server 602 and/or a user device such as user devices 606, described below in connection with FIG. 6. In some embodiments, process 100 can make use of communication networks, such as communication network 604.

In some embodiments, process 100 can begin at 102 when a user interface is loaded onto a display device, such as a display of user devices 606. In some embodiments, the user interface can be associated with any suitable program, application, and/or service that is being executed in conjunction with the display of the user interface. In some embodiments, at 102, process 100 can identify a plurality of layers in the two-dimensional (2-D) interface. In some embodiments, each layer can contain any suitable user interface elements and/or components, such as text boxes, display areas, etc., as discussed further in connection with FIGS. 2, 3A, and 3B below. In some embodiments, each layer can have an associated layer depth value, which indicates a presentation order of each layer in the plurality of layers. In some embodiments, each layer can have an associated transparency and/or opacity value. In some embodiments, process 100 can determine that a subset of layers have an opacity value below a threshold value and can remove the subset of layers from the plurality of layers.

In some embodiments, process 100 can continue at 104 by selecting a reference layer from the plurality of layers. In some embodiments, the reference layer can have a layer depth value that indicates the reference layer is the bottom-most layer in the presentation order. In some embodiments, the reference layer can be a layer that contains information regarding the size, orientation, resolution, etc., of the display device where the user interface is displayed. In some embodiments, process 100 can also select a target layer from the plurality of layers. In some embodiments, the target layer can be a layer containing elements and/or components that produce a user engagement signal, such as content cards, search boxes, etc.

In some embodiments, process 100 can continue at 106 by determining a portion of the target layer that intersects the reference display layer. For example, in some embodiments, a layer containing a grid of content cards can be configured to extend beyond the size of the display device. Continuing this example, process 100 can determine the portion of the grid that currently appears on the display device by determining the intersection of the reference display layer with the layer containing the grid of content cards.

In some embodiments, process 100 can continue at 108 by determining, among the remaining layers (that is, excluding the reference layer and/or the target layer), a particular layer that is displayed above the reference layer and/or the target layer. In some embodiments, the particular layer can cause a portion of the reference layer and/or the target layer to be hidden and/or obstructed from view. In some embodiments, the particular layer can obstruct the reference layer and/or target layer through a particular component in the particular layer. In some embodiments, the portion of the reference layer and/or the target layer that is obstructed can be an element and/or component which can be termed a hidden component. In some embodiments, a hidden component can be partially hidden by any suitable amount for process 100 to determine that component as a hidden component.

Alternatively, in some embodiments, at 108, process 100 can determine hidden components that occur within the boundary of the intersecting portion of the reference layer and the target layer determined at 106, as described below in process 500 in connection with FIG. 5.

In some embodiments, at 108, process 100 can determine an outline and/or a boundary of the hidden component, and can additionally determine both the hidden portion of the boundary and any portion of the boundary that remains visible. In some embodiments, process 100 can determine the total area of the component that is at least partially obstructed and/or hidden, and can determine both the area of the hidden portion and the area of the visible portion.

In some embodiments, at 108, process 100 can determine an outline and/or a boundary of each layer component that results in a hidden component in the target layer (i.e., an obstructing layer component). In some embodiments, at 108, process 100 can determine any suitable property of each obstructing layer component. For example, in some embodiments, process 100 can determine the layer depth value, the location, size, boundary value(s), area, and/or content of each obstructing layer component. In some embodiments, as described below in process 500 in connection with FIG. 5, process 100 can determine that multiple obstructing layer components overlap with each other.

In some embodiments, at 110, process 100 can associate the plurality of layer components with an obstruction database. In some embodiments, the obstruction database can be linked to the layer where the obstructed components occur. For example, in some embodiments, the obstruction database can be linked to the reference layer when process 100 determines obstructed components in the reference layer. In another example, in some embodiments, the obstruction database can be linked to the target layer when process 100 determines obstructed components in the target layer, and/or the intersection of the reference layer and the target layer.

In some embodiments, each entry in the obstruction database can include: the obstructed component, the associated properties and information determined at 108 for the component(s) causing the obstruction, and/or any other suitable information. In some embodiments, each layer component causing an obstruction can have a particular entry in the obstruction database. In some embodiments, each entry can contain any suitable properties of the layer component, such as the properties determined at block 108 including layer depth value, location, size, boundary values, etc. In some embodiments, each entry can additionally contain an indication of which component or portion of a component in the target layer is hidden (or partially hidden) by the layer component of that entry. In some embodiments, when a component is partially hidden, process 100 can include a percentage value of how much of the component is hidden (or visible). In some embodiments, the obstruction database can include any other suitable information.

In some embodiments, at 112, process 100 can determine and/or receive a user engagement signal. In some embodiments, a user engagement signal can be generated based on any suitable user interaction with the user interface. For example, in some embodiments, a user engagement signal can be generated when a user hovering a mouse over a particular portion of the user interface (e.g., a particular content item, image, etc.). In another example, in some embodiments, a user engagement signal can be generated when a user interacts with an icon (e.g., selecting "favorite" items in a list), selecting text on a page, scrolling through a page, navigating the user interface using one or more links (e.g., hyper-links), etc.

In some embodiments, at 112, process 100 can determine that the user engagement signal is based on a component of the user interface that has an entry in the obstruction database as a hidden component. In some embodiments, process 100 can generate a modified user engagement signal by removing a portion of the user engagement signal that is based on the hidden component. For example, in some embodiments, process 100 can receive a list of content items (e.g., a subset of all content items appearing in the user interface) that received a user interaction, such as a mouse over, a click-through, a "like" and/or "dislike" click, etc. Continuing this example, in some embodiments, process 100 can cross-reference the list of content items with the list of hidden components in the obstruction database. Further continuing this example, in some embodiments, process 100 can remove from the list any entries which have an entry in the obstruction database as hidden components. In some embodiments, process 100 can determine that a partially hidden component has a visibility below a threshold amount (e.g., the component is mostly hidden) before removing the portion of the user engagement signal.

In some embodiments, process 100 can remove the portion of the user engagement signal based on any amount of the hidden component being obstructed. For example, in some embodiments, process 100 can determine that only one pixel in a particular user interface component is visible, with the remainder of the component hidden by another layer in the user interface. Continuing this example, in some embodiments, process 100 can remove the user engagement signal based on that particular user interface element. In some embodiments, process 100 can include any additional analysis of the user engagement signal before removing the portion of the user engagement signal that is based on at least one hidden component.

In some embodiments, process 100 can loop to block 102 after modifying the user engagement signal. In some embodiments, process 100 can loop any suitable number of times while the user interface is displayed. For example, in some embodiments, process 100 can be executed when any component of the user interface changes state (e.g., a user scrolls through new content, a user selects content and navigates to a new page, etc.). As a particular example, in some embodiments, process 100 can be executed when any component in the user interface is assigned a new layer depth value (e.g., in response to an interaction with a user), such as to a focus layer as discussed below in connection with content item 327 in FIG. 3.

Figure 2:
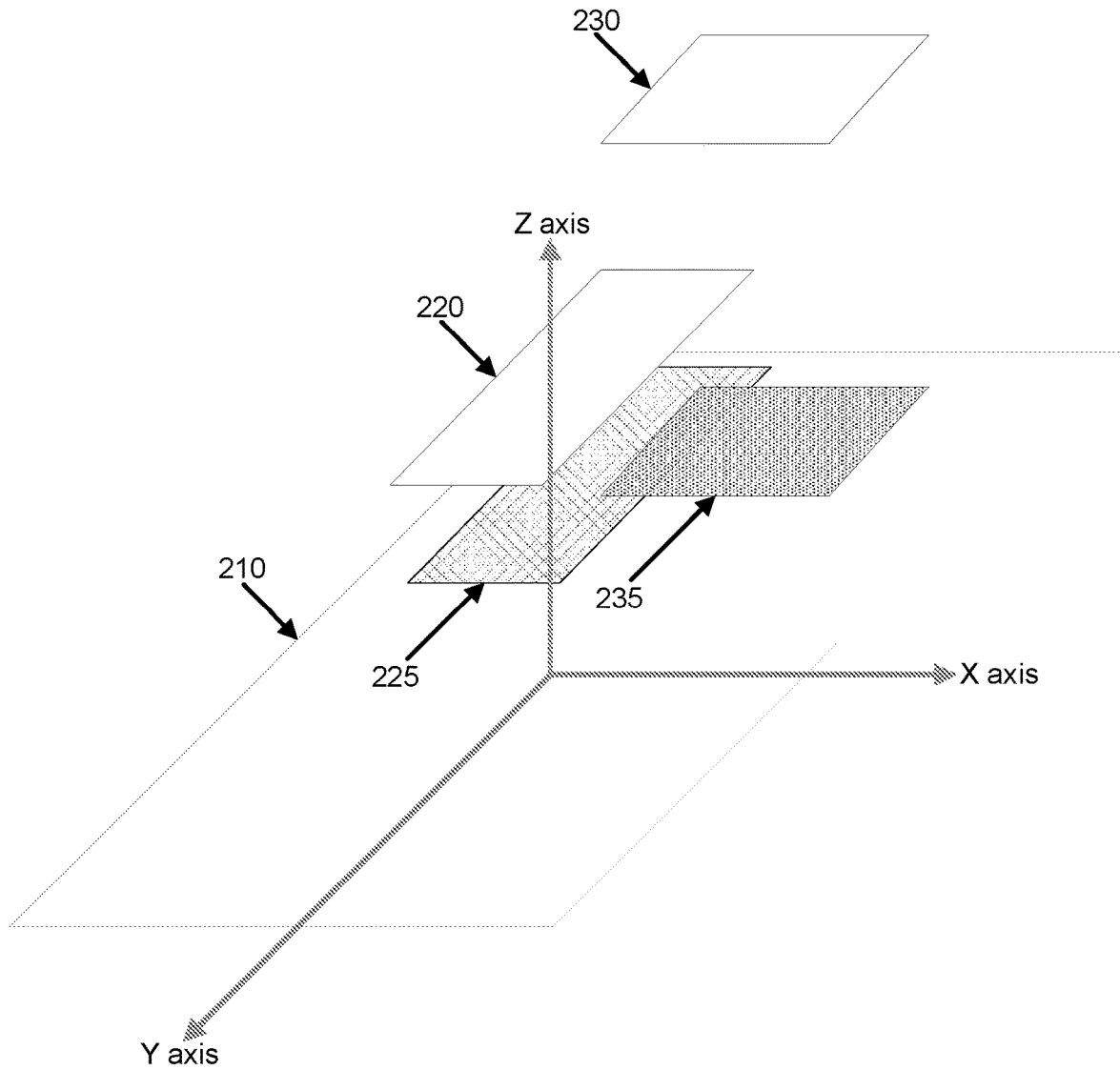
FIG. 2 shows an illustrative user interface with elements in multiple layers in accordance with some embodiments of the disclosed subject matter.

Turning to FIG. 2, an example illustration of a user interface 200 containing multiple layers in accordance with some embodiments of the disclosed subject matter is shown. As shown, user interface 200 includes reference layer 210, layer 220 with layer projection 225, layer 230 with layer projection 235, and a Cartesian coordinate reference system with an x-axis, y-axis, and z-axis.

In some embodiments, reference layer 210 can be any suitable width along the x-axis and height along the y-axis. For example, in some embodiments, reference layer 210 can be a size of a display device (e.g., mobile phone screen, tablet screen, computer monitor) that can present user interface 200. In another example, in some embodiments, reference layer 210 can be a relative size with any suitable margin, offset, border, and/or additional sizing modification to the size of a display device. In some embodiments, reference layer 210 can be the bottom-most layer within user interface 200 with a z-axis and/or layer depth value of zero.

In some embodiments, layers 220 and 230 can include any suitable user interface elements and/or components such as text boxes, image and/or video display area(s), regions for user input and/or selectable navigation elements such as buttons, radio selector(s), text boxes, sliders, expandable menu icons, etc. In some embodiments, layers 220 and 230 can have any suitable shape and can have any suitable dimensions, including three dimensional (3-D) geometries. For example, in some embodiments, layers 220 and 230 can each be a two-dimensional rectangle, each having any suitable width along the x-axis and height along the y-axis. In another example, in some embodiments, layer 220 and/or layer 230 can be a relative size of reference layer 210 with any suitable margin(s), x-axis offset, y-axis offset, border, and/or additional sizing modification that is relative to reference layer 210. In some embodiments, layers 220 and 230 can have any additional user interface properties, such as a transparency and/or opacity value, an identification object (e.g., pointer, string, etc.), a parent-child association (e.g., layer 230 is a child of layer 220) and/or any other suitable properties.

In some embodiments, layers 220 and 230 can each have a non-zero value on the z-axis, indicating a layer depth value for presenting each layer. For example, in some embodiments, layer 220 can have an integer value on the z-axis (such as 1), and layer 230 can have a different integer value on the z-axis (such as 2). In some embodiments, layer 220 and layer 230 can have the same z-axis value and, in some embodiments, can be considered a single layer.

In some embodiments, the z-axis value of layers 220 and 230 can indicate the depth of each respective layer ("layer depth value") when all layers contained in the user interface are presented on a display. In some embodiments, layer 220 can be projected onto reference layer 210, as indicated by layer projection 225. In some embodiments, layer 230 can be projected onto reference layer 210, as indicated by layer projection 235. In some embodiments, layer projection 225 and layer projection 235 can overlap by any suitable amount. For example, as shown in FIG. 2, layer projection 225 can have a small section of the right-hand edge covered by layer projection 235 when the user interface is presented with the higher layer depth values (i.e., z-axis values) above lower layer depth values in some embodiments. That is, because layer 220 has a layer depth value of 1, user interface 200 is presented with layer projection 225 displayed below layer projections with a larger layer depth value. Similarly, because layer 230 has a layer depth value of 2, user interface 200 is presented with layer projection 235 displayed above layer projections with a smaller layer depth value. In some embodiments, any suitable mechanism can be used to determine the amount (e.g., percentage of area, range of coordinates, range of boundary values, etc.) of projection 225 that is covered, or obstructed, by projection 235. For example, in some embodiments, process 100 as described above in connection with FIG. 1 can determine coordinate values of projection 225 that occur at the boundary between pixels that are obstructed and pixels that are visible. Continuing this example, in some embodiments, process 100 can additionally track layer 220 and layer 230 in an obstruction database as layers that are obstructed and cause obstruction, respectively.

Figure 3A:
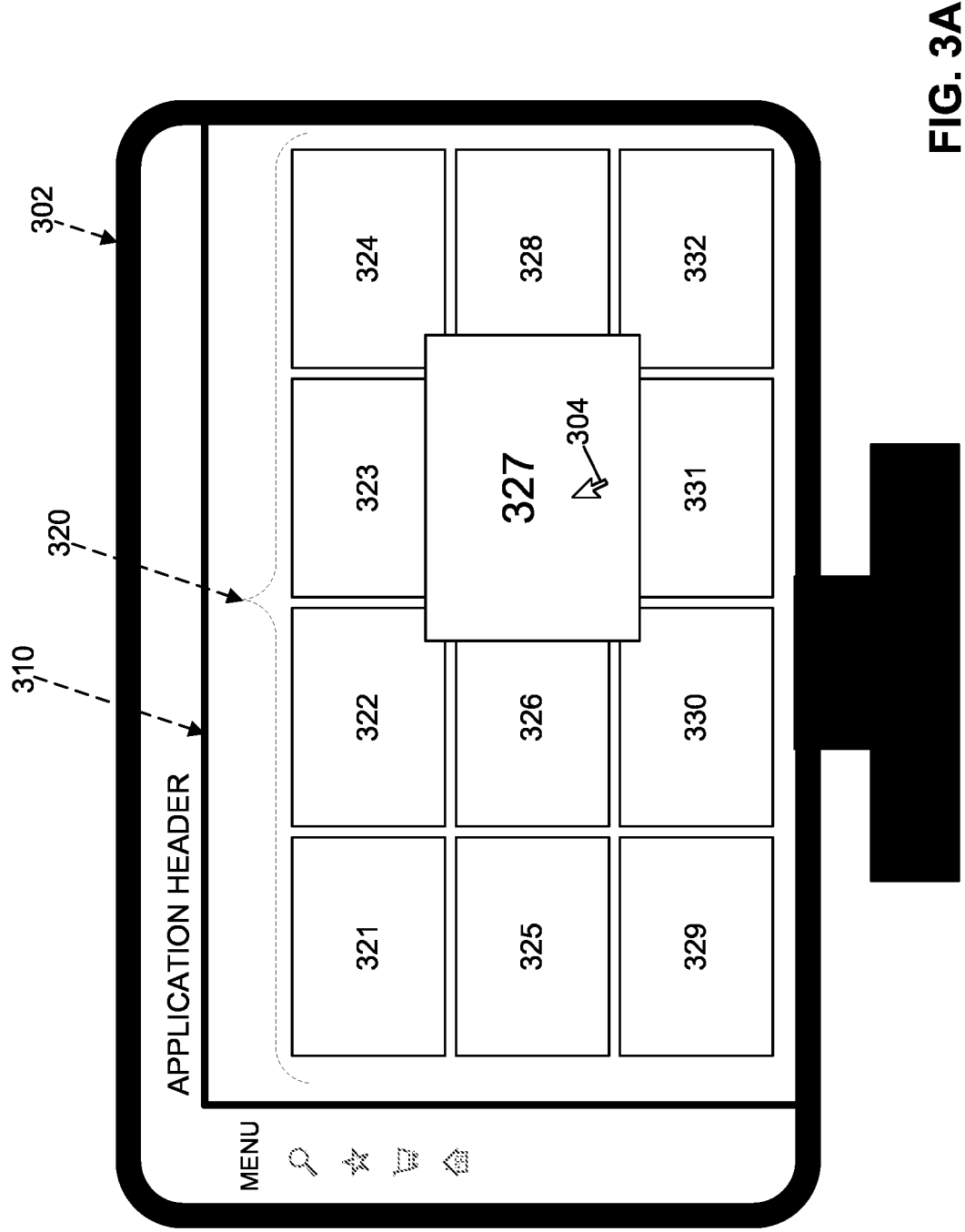
FIGS. 3A and 3B show examples of user interface displays that contain elements creating obstructing portions of the viewing screen in accordance with some embodiments of the disclosed subject matter.
Figure 3B:
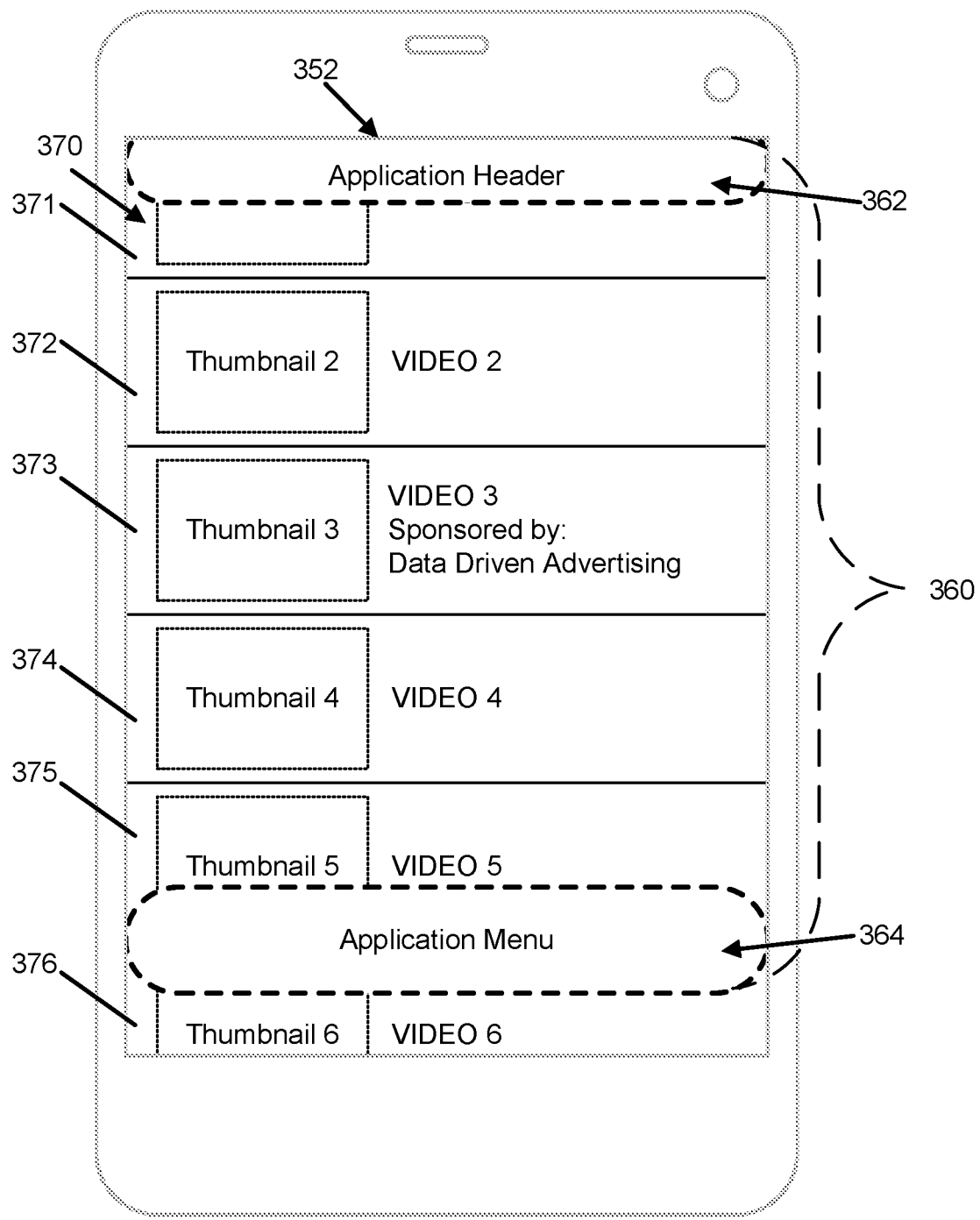

Turning to FIGS. 3A and 3B, example user interface displays 300 and 350 that each contain obstructed portions of a layer in the user interface in accordance with some embodiments of the disclosed subject matter are shown. As shown in FIG. 3A, user interface 300 presented on display 302 includes menu layer 310 and grid layer 320, where grid layer 320 includes content item cards 321-332. As shown in FIG. 3B, user interface 350 presented on display 352 includes menu layer 360 and video feed layer 370, where video feed layer 370 includes video feed content items 371-376.

In some embodiments, user interface 300 and/or 350 can be associated with any suitable program and/or application. For example, in some embodiments, user interface 300 and/or 350 can be a graphical user interface (GUI) for any suitable media application such as: a photo viewing and/or editing application; an audio application that can play audio files while also displaying artist, song, and/or album information; a video streaming application that is connected to a content delivery network and/or streaming service, etc.

Figure 7:
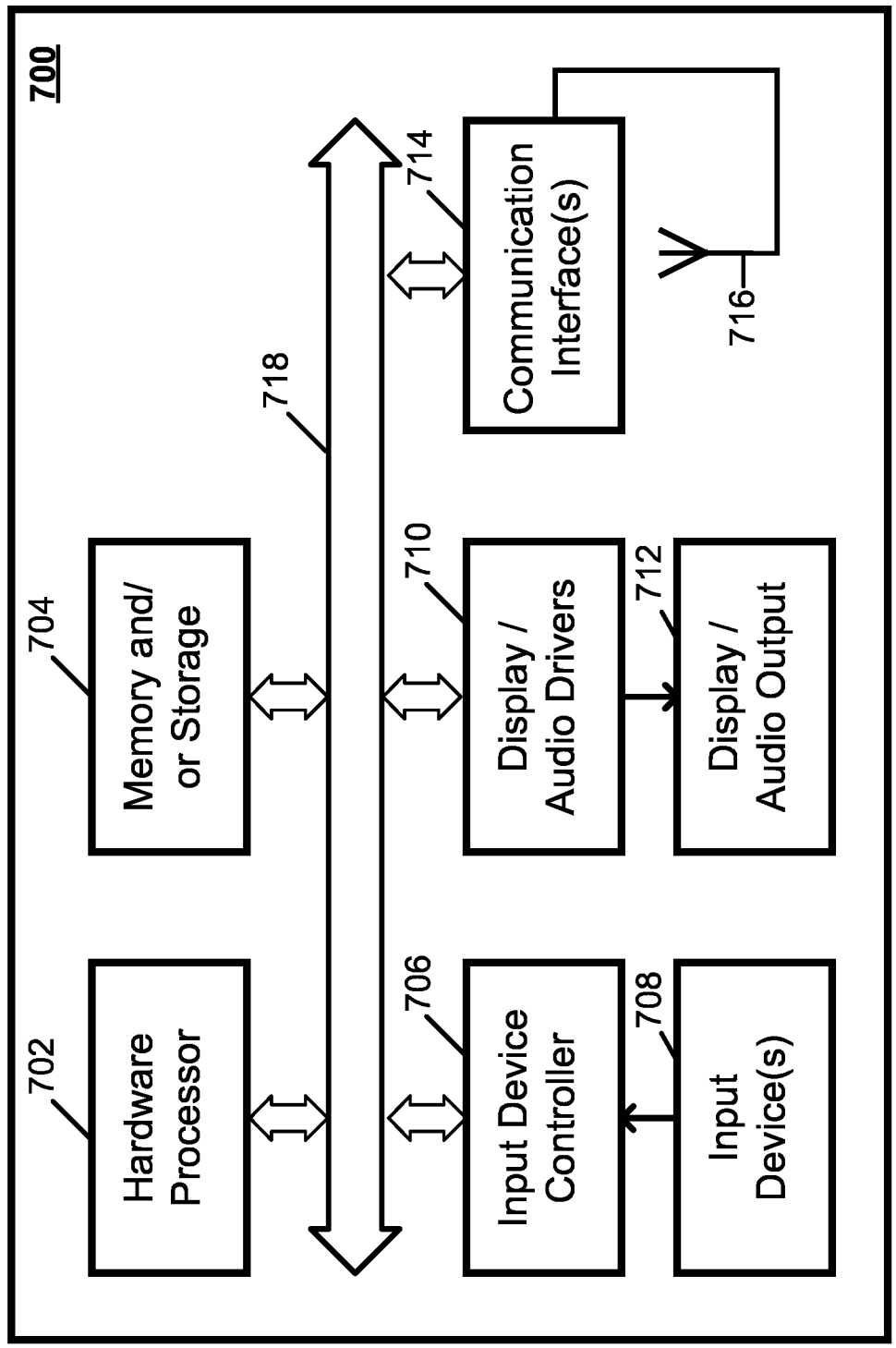
FIG. 7 shows an example block diagram of hardware that can be used in a server and/or a user device of FIGS. 2, 3A, 3B, and 4 in accordance with some implementations of the disclosed subject matter.

In some embodiments, display 302 and/or 352 can be any suitable display device, such as display devices 712 as discussed below in connection with FIG. 7. In some embodiments, display 302 and/or 352 can be used to create and/or assign a reference layer within user interface 300 and/or 350, respectively, that has the dimensions (e.g., height, width, resolution, etc.) of display 302 and/or 352. For example, in some embodiments, user interface 300 and/or 350 can be made such that the arrangement, presentation, sizing, etc. of layers, input elements, display elements, and/or any other suitable elements within user interface 300 and/or 350 can be automatically adjusted based on the size of display device 302 and/or 352, respectively. In another example, in some embodiments, user interface 300 and/or 350 can select from a predefined series of layouts for the layers, input elements, display elements, and/or any other suitable elements based on the size of display 302 and/or 352, respectively.

In some embodiments, user interface 300 and/or 350 can include any suitable navigation input, such as mouse pointer 304, which can be from any suitable input device such as input devices 708 as discussed below in connection with FIG. 7.

As shown in FIG. 3A, in some embodiments, menu layer 310 can include any suitable user interface elements and/or components such as text boxes (e.g., search boxes, text displays), regions for user input and/or selectable navigation elements such as buttons, radio selector(s), text boxes, sliders, expandable menu icons, etc. For example, as shown in FIG. 3A, menu layer 310 can include a header, a menu selection of a search icon, a star icon (e.g., selectable to designate a "favorite" content item), a shopping cart icon, and a home icon. In some embodiments, icons and text in menu layer 310 can be selectable and/or modified through a user interacting with user interface 300.

In some embodiments, the area of menu layer 310 can be larger than the visible area of menu layer 310 presented on a display device. In some embodiments, menu layer 310 can have any suitable layer depth value, as discussed above in connection with FIG. 2. In some embodiments, menu layer 310 can include any other suitable elements and/or components. In some embodiments, menu layer 310 can be displayed in any suitable region within user interface 300.

In some embodiments, grid layer 320 can include any suitable user interface elements and/or components such as content cards 321-332. In some embodiments, grid layer 320 can be displayed in any suitable region within user interface 300, and can have any suitable quantity of content cards displayed per row and/or per column. In some embodiments, the area of grid layer 320 can be larger than the visible area of grid layer 320 presented on a display device. For example, in some embodiments, grid layer 320 can include additional content cards (not shown) which can replace content cards 321-332 in display 302 as a user scrolls (either vertically and/or horizontally) within user interface 300.

In some embodiments, grid layer 320 can have any suitable layer depth value, as discussed above in connection with FIG. 2. In some embodiments, elements and/or components such as content cards 321-332 within grid layer 320 can have the same layer depth value.

In some embodiments, content cards 321-332 can contain any suitable content. For example, in some embodiments, content cards 321-332 can display text, imagery, thumbnail images, and/or any other suitable content that relates to and/or contains links to content hosted by the program and/or application associated with user interface 300.

In some embodiments, elements and/or components such as content cards 321-332 within grid layer 320 can be assigned to a new layer (and a new layer depth value) such as a focus layer based on any suitable mechanism. In particular, in some embodiments, content cards can be assigned to a new layer in response to user interaction with grid layer 320. For example, in some embodiments, content cards 321-332 can change appearance, size, orientation, and/or cause any other change to the presentation of a particular content card when user interface 300 detects that mouse pointer 304 hovers, selects, and/or performs any other suitable action on and/or near the particular content card. Continuing this example, in some embodiments, a new layer depth value can be assigned to the content card as part of the change to the presentation of the content card. As a particular example, as shown, mouse pointer 304 can hover over content card 327 which can cause user interface 350 to change the size of content card 327 (relative to the content cards remaining in grid layer 320). In this example, in some embodiments, user interface 350 can also assign a new layer depth value to content card 327, where the new layer depth value is any suitable value (e.g., a larger integer value) which causes content card 327 to be displayed above and/or on top of the remaining content cards in grid layer 320.

In some embodiments, as shown in FIG. 3B, a user interface such as user interface 350 on a mobile phone application can include an obstructed view. For example, in some embodiments, menu layer 360 can appear above video feed layer 370, and can cause elements and/or components of video feed layer 370 to be hidden behind elements and/or components of menu layer 360.

In some embodiments, menu layer 360 can include any suitable user interface elements and/or components such as text boxes (e.g., search boxes, text displays), regions for user input and/or selectable navigation elements such as buttons, radio selector(s), text boxes, sliders, expandable menu icons, etc. For example, as shown in FIG. 3B, menu layer 360 can include an application header 362 and an application menu 364.

In some embodiments, the area of menu layer 360 and/or video feed layer 370 can be larger than the display area of the user interface presented on a display device. In some embodiments, as discussed above, display 352 can assign a reference layer within user interface 350 that is the size of display 352. In some embodiments, any mechanism which involves determining hidden components in user interface 350 (such as process 100 as discussed in FIG. 1.) can use the reference layer that is the size of display 352 to determine the intersection area of menu layer 360 and/or video feed layer 370 and display 352. As a particular example, video feed layer 370 can have a size that accommodates additional video feed content items beyond those displayed in FIG. 3B in some embodiments. In this particular example, determining that portions of the video feed layer 370 which do not appear on display 352 are obstructed can use computation resources in some embodiments but can have little meaning for modifying user engagement signals. Continuing this particular example, such portions of video feed layer 370 (that do not appear on display layer 352) can be omitted from an obstruction database by determining the intersection of video feed layer 370 with the reference display layer.

In some embodiments, menu layer 360 can have any suitable layer depth value, as discussed above in connection with FIG. 2. In some embodiments, menu layer 360 can include any other suitable elements and/or components. In some embodiments, menu layer 360, application header 362, and application menu 364 can be positioned in any suitable region within user interface 350.

In some embodiments, video feed layer 370 can include any suitable user interface elements and/or components such as video feed content items 371-376. In some embodiments, video feed layer 370 can be scrollable. In some embodiments, video feed layer 370 can update the presentation of video feed content items 371-376 when the user interacts by scrolling. For example, in some embodiments, video feed layer 370 can present video feed content items 371-376 in an updated position (at the top of the video feed, at the bottom of the video feed, etc.) according to the user swipe direction and/or by presenting new video feed content items as the user continues scrolling.

In some embodiments, video feed layer 370 and video feed content items 371-736 can have the same layer depth value. In some embodiments, video feed layer 370 and video feed content items 371-376 can have a layer depth value that is a smaller value than menu layer 360. In some embodiments, video feed layer 370 and video feed content items 371-376 can be presented beneath menu layer 360. In some embodiments, a particular item in the video feed content items can be presented beneath components of menu layer 360 based on the layer depth values of menu layer 360 and video feed layer 370. For example, as shown in FIG. 3B, video feed content item 371 is obstructed from view by application header 362. In this example, as shown, the video title of video feed content item 371 can be obstructed in some embodiments. In another example, as shown, video feed content items 375 and 376 can be obstructed by application menu 364. In some embodiments, any suitable mechanism such as process 100 as described above in connection with FIG. 1 can be used to determine the amount (e.g., percentage, number of pixels, etc.) of each item from video feed content items 371, 375, and 376 that is obscured at any given moment. For example, in some embodiments, process 100 can be executed whenever a scrolling input is detected, and process 100 can update an obstruction database with the portion(s) of the video feed that are obscured after video feed layer 370 is updated based on the scrolling input.

In some embodiments, video feed layer 370 can include video feed content item 373 that is sponsored and/or advertising content. In some embodiments, user interface 350 and/or the associated application can use any suitable mechanism, such as process 100, to determine that the sponsored and/or content has been obstructed, for example by application menu 364. For example, in some embodiments, any suitable mechanism can use the obstruction database from process 100 to determine the visibility of the sponsored and/or advertising content, such as determining that the sponsored content appeared in an obstruction database as a hidden component, determining a length of time the sponsored and/or advertising content was hidden and/or visible, and/or if a user engagement signal was modified in response to the sponsored and/or advertising content appearing in the obstruction database (as a hidden component and/or an obstructing component).

Figure 4:
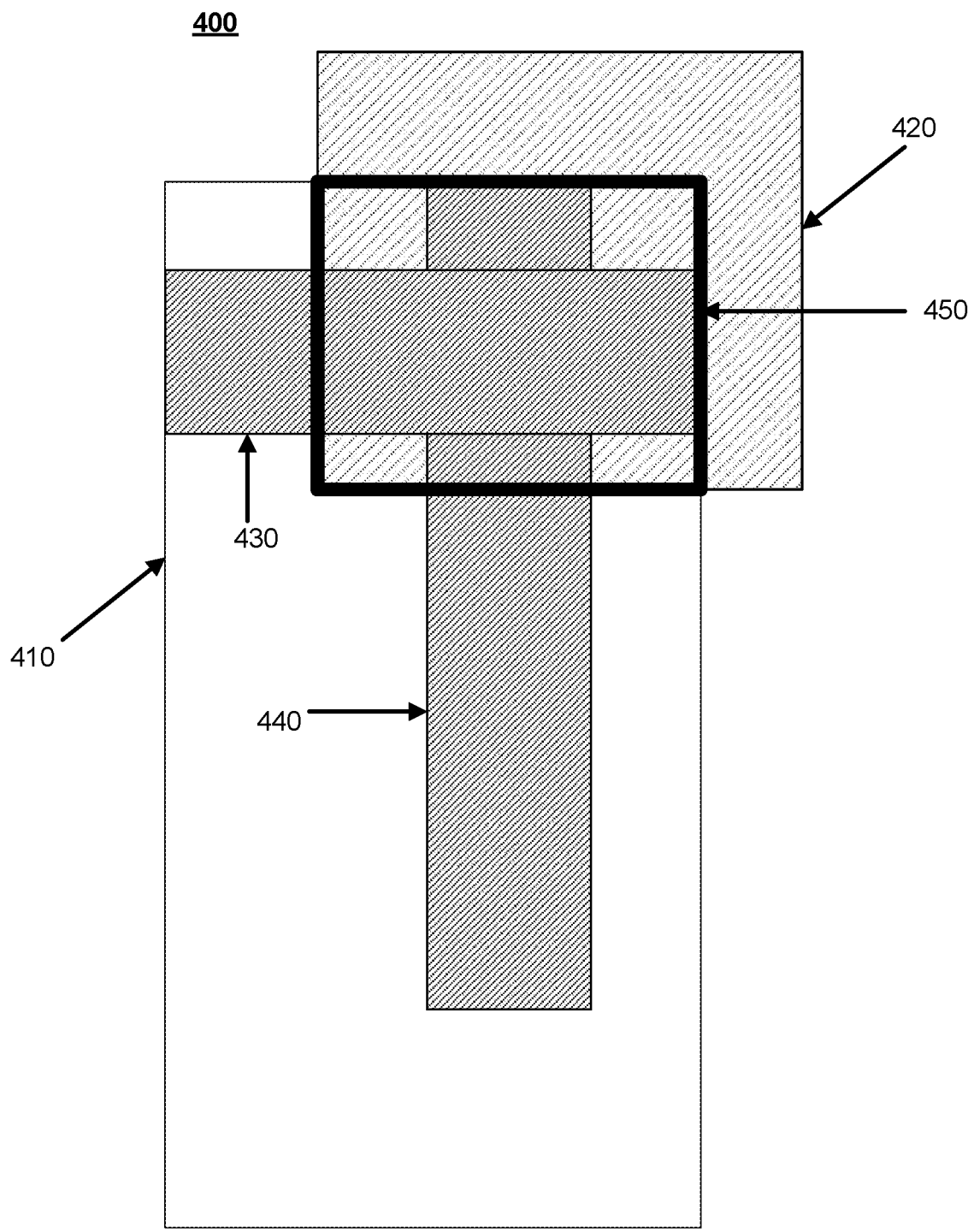
FIG. 4 shows an illustrative example of determining obstructing portions of a user interface in accordance with some embodiments of the disclosed subject matter.

Turning to FIG. 4, an example illustration of a user interface containing obstructed portions in accordance with some embodiments of the disclosed subject matter is shown. As shown, user interface 400 can include a display reference layer 410, a target layer 420, and obstructing layers 430 and 440. In some embodiments, user interface 400 can be displayed on any suitable device, such as user devices 606 as described below in connection with FIG. 6.

In some embodiments, display reference layer 410 can be any suitable width and height. For example, in some embodiments, reference layer 410 can be a size (e.g., in pixels) of a display device (e.g., mobile phone screen, tablet screen, computer monitor) that can display user interface 400. In another example, in some embodiments, reference layer 410 can be a relative size with any suitable margin, offset, border, and/or additional sizing modification to the size of a display device. In some embodiments, reference layer 410 can be the bottom-most layer within user interface 400. For example, in some embodiments, reference layer 410 can have a Z-axis and/or layer depth value of zero.

In some embodiments, target layer 420 can have any suitable user interface elements and/or components. For example, in some embodiments, target layer 420 can have a grid with content item cards, such as grid layer 320 described above in connection with FIG. 3A. In another example, in some embodiments, target layer 420 can have a video feed, such as video feed layer 370 as described above in connection with FIG. 3B.

In some embodiments, obstructing layer 430 and/or 440 can be any suitable user interface layers that have a layer depth value higher than reference layer 410 and/or target layer 420. For example, in some embodiments, obstructing layer 430 and/or 440 can be a focus layer containing a content card, such as content card 327, which is presented on top of grid layer 320 as described above in connection with FIG. 3A. In another example, in some embodiments, obstructing layer 430 and/or 440 can be a menu layer, such as menu layer 360, which is presented on top of video feed layer 370 as described above in connection with FIG. 3B.

In some embodiments, any suitable mechanism can be used to determine the portions of target layer 420 that are obstructed by obstructing layer 430 and/or 440. For example process 100 as described above in connection with FIG. 1 can track portions of target layer 420 that remain visible when obstructing layer 430 and/or 440 are presented above target layer 420 in some embodiments.

In some embodiments, any suitable mechanism can be used to determine the portion of user interface 400 that is the intersection of target layer 420 and reference layer 410, as shown by intersection 450 in FIG. 4.

Figure 5:
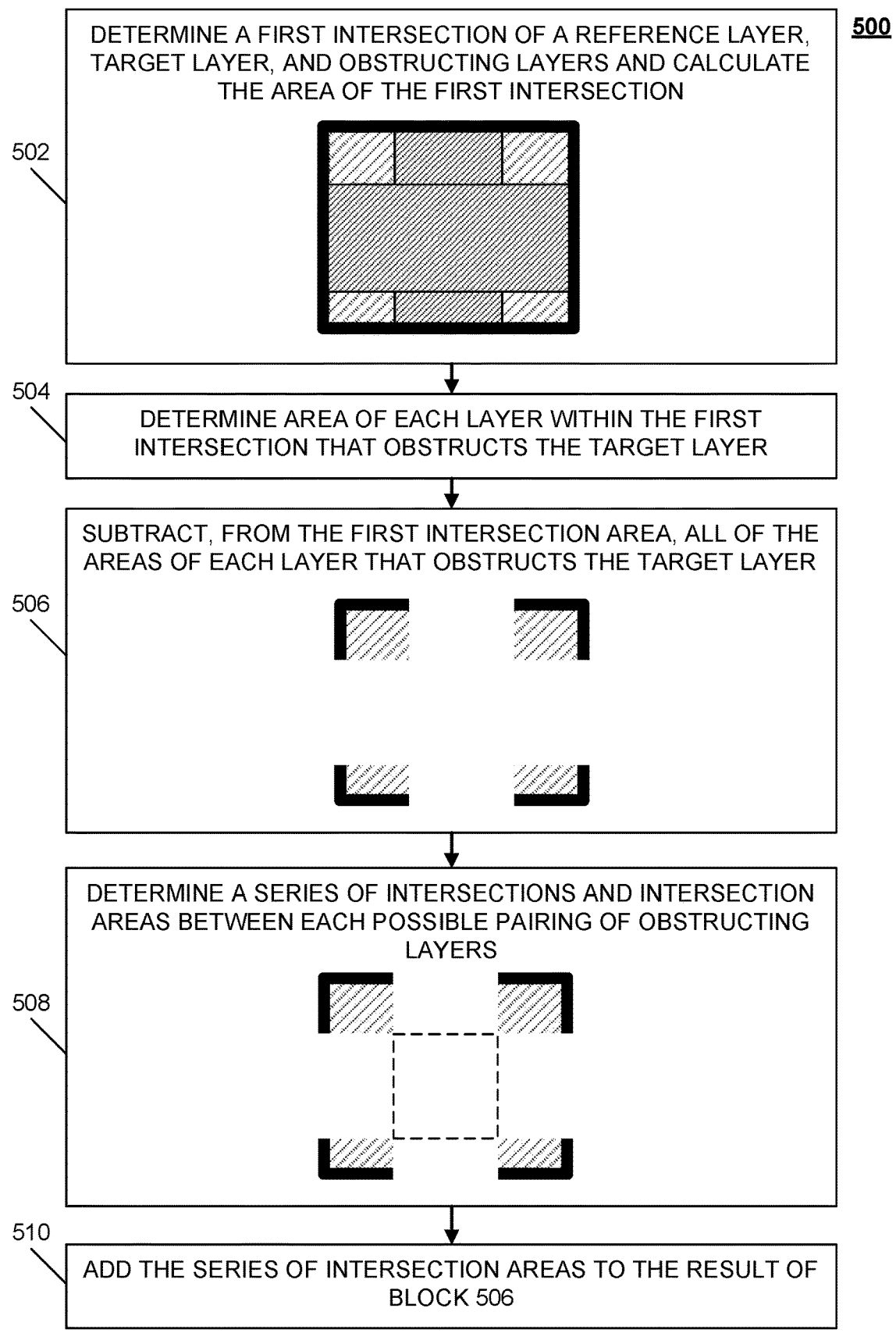
FIG. 5 shows an example flow diagram of an illustrative process for determining obstructing portions of a layer in a user interface in accordance with some embodiments of the disclosed subject matter.

Turning to FIG. 5, a flow diagram of a process 500 for determining obstructing portions of a layer in a user interface in accordance with some embodiments of the disclosed subject matter is shown. In some embodiments, process 500 can run on a server such as server 602 and/or a user device such as user devices 606, described below in connection with FIG. 6. In some embodiments, process 500 can make use of communication networks, such as communication network 604.

In some embodiments, process 500 can be executed as a sub-routine of any other suitable process, such as process 100. For example, in some embodiments, process 500 can be executed at block 108 of process 100 as described above in connection with FIG. 1.

In some embodiments, process 500 can begin at 502 where process 500 can determine the intersection of a reference layer, such as reference display layer 410, and a target layer, such as target layer 420. As shown, the intersection of reference display layer 410 and target layer 420 can be determined as intersection 450. In some embodiments, process 500 can determine the area of the intersection, such as the area of intersection 450.

In some embodiments, process 500 can, at 502, further determine portions of additional layers, such as obstructing layer 430 and/or 440, that are above the target layer (e.g., have a larger layer depth value) and that have portions, elements, and/or components that are within the intersection of the reference layer and the target layer.

In some embodiments, process 500 can continue at 504 by determining the area(s) of the obstructing layers that are within the intersection of the reference layer and the target layer. For example, in some embodiments, process 500 can determine the area(s) of the portion(s) of obstructing layer 430 and/or 440 that is within intersection 450.

In some embodiments, process 500 can continue at 506 by subtracting, from the intersection area determined at 502, all of the areas determined at 504.

In some embodiments, process 500 can continue at 508 by determining, for each possible pairings of obstructing layers within the boundary of the intersection layer, that one obstructing layer overlaps with another obstructing layer. Further, at 508, process 500 can determine the areas of all such obstructing layer overlaps in some embodiments. For example, as shown in block 508, the central square has been subtracted from intersection 450 twice, once in the subtraction of the area of obstructing layer 430 within intersection 450 and a second time in the subtraction of the area of obstructing layer 440 within intersection 450.

In some embodiments, the determination at 510 of additional layer intersections can allow for process 500 to compensate for any areas that were subtracted multiple times at 506, due to the same portion of area being subtracted across multiple obstructing layers. That is, at 510, process 500 can add the areas determined at 508 to the subtraction result determined at 506. The net result of the calculation is a determination of the portion of the intersection area that remains visible in some embodiments. In some embodiments, any suitable additional determinations can be made in process 500, such as identifying boundaries and/or regions of the intersection that remain visible.

In some embodiments, process 500 can make the results of the determinations of the above blocks available to any other suitable processes, programs, and/or applications. For example, in some embodiments, when process 500 is executed as a sub-routine during execution of process 100, process 500 can provide any suitable output from determinations made at blocks 502-510 to an obstruction database as discussed at block 110 of process 100.

Figure 6:
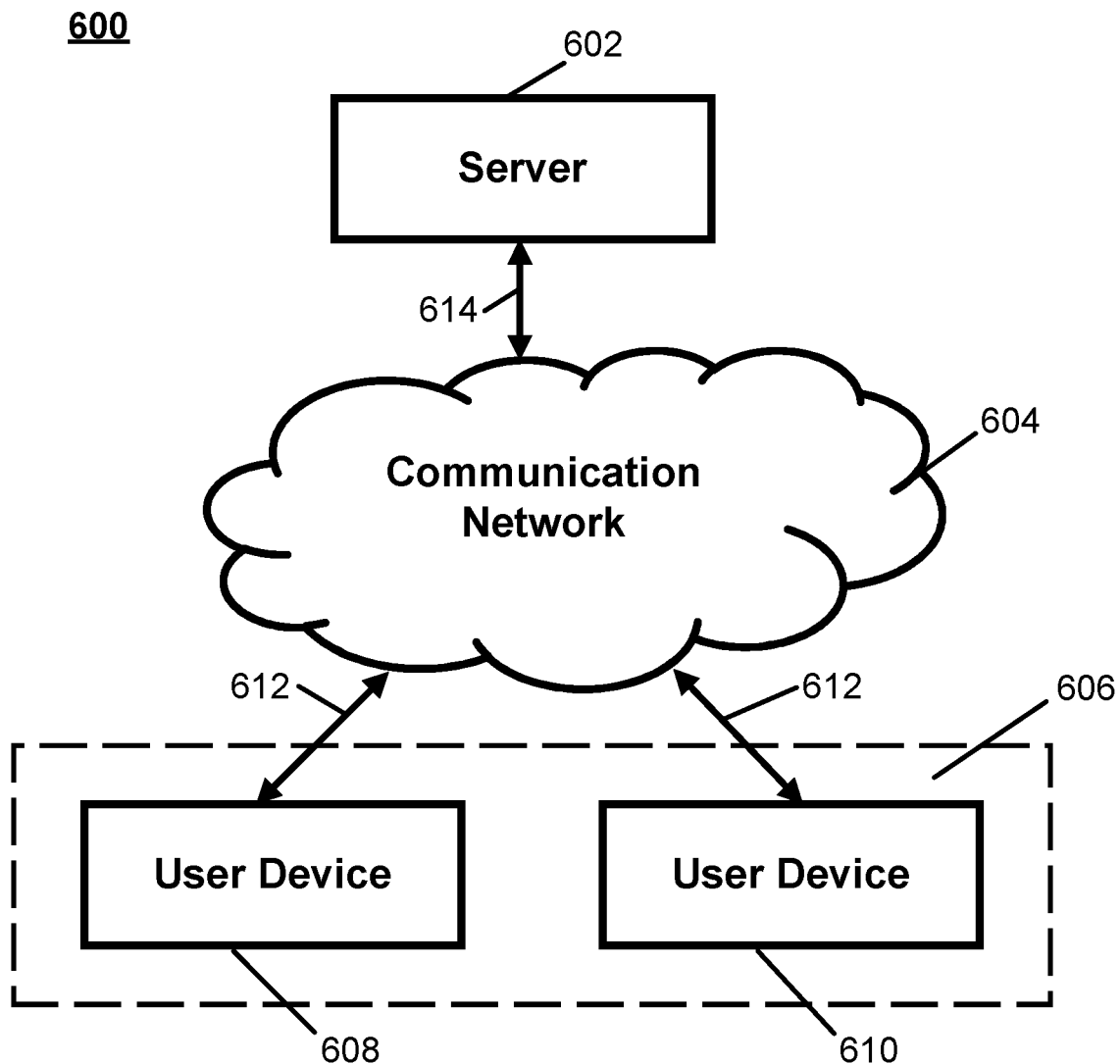
FIG. 6 shows an example block diagram of a system that can be used to implement the mechanisms described herein in accordance with some implementations of the disclosed subject matter.

Turning to FIG. 6, an example 600 of hardware for generating modified user engagement signals based on obstructing layers in a user interface in accordance with some implementations is shown. As illustrated, hardware 600 can include a server 602, a communication network 604, and/or one or more user devices 606, such as user devices 608 and 610.

Server 602 can be any suitable server(s) for storing information, data, programs, media content, and/or any other suitable content. In some implementations, server 602 can perform any suitable function(s).

Communication network 604 can be any suitable combination of one or more wired and/or wireless networks in some implementations. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 606 can be connected by one or more communications links (e.g., communications links 612) to communication network 604 that can be linked via one or more communications links (e.g., communications links 614) to server 602. The communications links can be any communications links suitable for communicating data among user devices 606 and server 602 such as network links, dial-up links, wireless links, hard-wired links, any other suitable communications links, or any suitable combination of such links.

User devices 606 can include any one or more user devices suitable for use with process 100 and/or process 500. In some implementations, user device 606 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 602 is illustrated as one device, the functions performed by server 602 can be performed using any suitable number of devices in some implementations. For example, in some implementations, multiple devices can be used to implement the functions performed by server 602.

Although two user devices 608 and 610 are shown in FIG. 6 to avoid overcomplicating the figure, any suitable number of user devices, (including only one user device) and/or any suitable types of user devices, can be used in some implementations.

Server 602 and user devices 606 can be implemented using any suitable hardware in some implementations. For example, in some implementations, devices 602 and 606 can be implemented using any suitable general-purpose computer or special-purpose computer and can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 704, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general-purpose computer or a special-purpose computer in some implementations. In some implementations, hardware processor 702 can be controlled by a computer program stored in memory and/or storage 704. For example, in some implementations, the computer program can cause hardware processor 702 to perform functions described herein.

Memory and/or storage 704 can be any suitable memory and/or storage for storing programs, data, documents, and/or any other suitable information in some implementations. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some implementations. For example, input device controller 706 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 710 can be any suitable circuitry for controlling and driving output to one or more display/audio output devices 712 in some implementations. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks, such as network 604 as shown in FIG. 6. For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 604) in some implementations. In some implementations, antenna 716 can be omitted.

Bus 718 can be any suitable mechanism for communicating between two or more components 702, 704, 706, 710, and 714 in some implementations.

Any other suitable components can be included in hardware 700 in accordance with some implementations.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of processes 100 and/or 500 can be executed or performed in any order or sequence not limited to the order and sequence shown in and described in connection with FIGS. 1 and 5. Also, some of the above blocks of processes 100 and/or 500 can be executed or performed substantially simultaneously where appropriate or in parallel to reduce latency and processing times. Additionally or alternatively, some of the above described blocks of processes 100 and/or 500 can be omitted and/or performed at a later time or in another suitable manner.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for generating user engagement signals of a user interface corresponding to media content, the method comprising:
   displaying a plurality of layers in the user interface:
   identifying the plurality of layers in the user interface, each of the plurality of layers having a layer depth value;
   determining a plurality of layer components from the plurality of layers;
   determining at least one hidden component from a first layer in the plurality of layers, wherein the at least one hidden component is obscured from view by one or more of the plurality of layer components while the plurality of layer components is displayed in a descending order indicated by the layer depth value of each of the plurality of layers;
   associating the plurality of layer components with the first layer in an obstruction database;
   generating, from user input received by the user interface, a user engagement signal of the user engagement signals; and
   generating, from the user engagement signal, a modified user engagement signal by at least:
      identifying, using the obstruction database, a portion of the user engagement signal that is based on the user input associated with the at least one hidden component;
      removing the portion of the user engagement signal that is based on the user input associated with the at least one hidden component; and
   outputting an indication that the user engagement signal was modified.

2. The method of claim 1, wherein the first layer in the plurality of layers has a first layer depth value associated with a lowest layer in the descending order indicated by the layer depth value of each of the plurality of layers.

3. The method of claim 1, wherein the method further comprises determining that a subset of layers in the plurality of layers each have an opacity below a threshold value, wherein the plurality of layer components are determined from the plurality of layers exclusive of the subset of layers.

4. The method of claim 1, wherein each entry in the obstruction database comprises a first indication of a particular component from the plurality of layer components, a second indication of a particular layer depth value associated with the particular component, and a third indication of the at least one hidden component that is obscured from view by the particular component.

5. The method of claim 1, wherein the method further comprises:
   determining an intersecting portion of a second layer in the plurality of layers that intersects the first layer,
   wherein the at least one hidden component is located in the intersecting portion and the second layer.

6. The method of claim 5, wherein a first size of the first layer is equal to a second size of a display device where the user interface is displayed.

7. A system for generating user engagement signals of a user interface corresponding to media content, the system comprising:
   a memory;
   a display device; and a hardware processor that is configured to:
  display a plurality of layers in the user interface on the display device;
  identify the plurality of layers in the user interface, each of the plurality of layers having a layer depth value;
  determine a plurality of layer components from the plurality of layers;
  determine at least one hidden component from a first layer in the plurality of layers, wherein the at least one hidden component is obscured from view by one or more of the plurality of layer components while the plurality of layer components is displayed in a descending order indicated by the layer depth value of each of the plurality of layers;
  associate the plurality of layer components with the first layer in an obstruction database;
  generate, from user input received by the user interface, a user engagement signal of the engagement signals; and
  generate, from the user engagement signal, a modified user engagement signal by at least:
    identifying, using the obstruction database, a portion of the user engagement signal that is based on the user input associated with the at least one hidden component;
    removing the portion of the user engagement signal that is based on the user input associated with the at least one hidden component; and output an indication that the user engagement signal was modified.

8. The system of claim 7, wherein the first layer in the plurality of layers has a first layer depth value associated with a lowest layer in the descending order indicated by the layer depth value of each of the plurality of layers.

9. The system of claim 7, wherein the hardware processor is further configured to determine that a subset of layers in the plurality of layers each have an opacity below a threshold value, wherein the plurality of layer components are determined from the plurality of layers exclusive of the subset of layers.

10. The system of claim 7, wherein each entry in the obstruction database comprises a first indication of a particular component from the plurality of layer components, a second indication of a particular layer depth value associated with the particular component, and a third indication of the at least one hidden component that is obscured from view by the particular component.

11. The system of claim 7, wherein the hardware processor is further configured to:
  determine an intersecting portion of a second layer in the plurality of layers that intersects the first layer,
  wherein the at least one hidden component is located in the intersecting portion and the second layer.

12. The system of claim 11, wherein a first size of the first layer is equal to a second size of a display device where the user interface is displayed.

13. A non-transitory computer-readable medium containing computer executable instructions that, when executed by a processor, cause the processor to execute a method for generating user engagement signals of a user interface corresponding to media content, the method comprising:
  displaying a plurality of layers in the user interface;
  identifying the plurality of layers in the user interface, each of the plurality of layers having a layer depth value;
  determining a plurality of layer components from the plurality of layers;
  determining at least one hidden component from a first layer in the plurality of layers, wherein the at least one hidden component is obscured from view by one or more of the plurality of layer components while the plurality of layer components is displayed in a descending order indicated by the layer depth value of each of the plurality of layers;
  associating the plurality of layer components with the first layer in an obstruction database;
  generating, from user input received by the user interface, a user engagement signal of the user engagement signals; and
  generating, from the user engagement signal, a modified user engagement signal by at least:
    identifying, using the obstruction database, a portion of the user engagement signal that is based on the user input associated with the at least one hidden component;
    removing the portion of the user engagement signal that is based on the user input associated with the at least one hidden component; and
    outputting an indication that the user engagement signal was modified.

14. The non-transitory computer-readable medium of claim 13, wherein the first layer in the plurality of layers has a first layer depth value associated with a lowest layer in the descending order indicated by the layer depth value of each of the plurality of layers.

15. The non-transitory computer-readable medium of claim 13, wherein the method further comprises determining that a subset of layers in the plurality of layers each have an opacity below a threshold value, wherein the plurality of layer components are determined from the plurality of layers exclusive of the subset of layers.

16. The non-transitory computer-readable medium of claim 13, wherein each entry in the obstruction database comprises a first indication of a particular component from the plurality of layer components, a second indication of a particular layer depth value associated with the particular component, and a third indication of the at least one hidden component that is obscured from view by the particular component.

17. The non-transitory computer-readable medium of claim 13, wherein the method further comprises:
  determining an intersecting portion of a second layer in the plurality of layers that intersects the first layer,
  wherein the at least one hidden component is located in the intersecting portion and the second layer.

18. The non-transitory computer-readable medium of claim 17, wherein a first size of the first layer is equal to a second size of a display device where the user interface is displayed.

* * * * *